(12) United States Patent
Kaplan et al.

(10) Patent No.: US 9,361,103 B2
(45) Date of Patent: Jun. 7, 2016

(54) STORE REPLAY POLICY

(71) Applicants: David A. Kaplan, Austin, TX (US); Jeff Rupley, Round Rock, TX (US); Tarun Nakra, Austin, TX (US)

(72) Inventors: David A. Kaplan, Austin, TX (US); Jeff Rupley, Round Rock, TX (US); Tarun Nakra, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 691 days.

(21) Appl. No.: 13/667,095

(22) Filed: Nov. 2, 2012

(65) Prior Publication Data

US 2014/0129776 A1    May 8, 2014

(51) Int. Cl.
*G06F 12/00* (2006.01)
*G06F 9/30* (2006.01)
*G06F 9/38* (2006.01)
*G06F 12/08* (2016.01)

(52) U.S. Cl.
CPC ........ *G06F 9/30065* (2013.01); *G06F 9/30043* (2013.01); *G06F 9/3861* (2013.01); *G06F 12/0802* (2013.01); *G06F 12/0815* (2013.01)

(58) Field of Classification Search
CPC  G06F 12/0802; G06F 9/3861; G06F 9/30043
See application file for complete search history.

(56) References Cited

U.S. PATENT DOCUMENTS

| 5,265,233 | A  | * | 11/1993 | Frailong et al. | 711/118 |
| 2003/0204668 | A1 | * | 10/2003 | Wilcox et al. | 711/105 |
| 2004/0083341 | A1 | * | 4/2004 | Robinson et al. | 711/133 |
| 2004/0163082 | A1 | * | 8/2004 | Tremblay et al. | 718/101 |
| 2006/0190498 | A1 | * | 8/2006 | Pruet, III | 707/202 |
| 2006/0294326 | A1 | * | 12/2006 | Jacobson et al. | 711/156 |
| 2008/0086623 | A1 |   | 4/2008 | Lien et al. | |
| 2012/0124296 | A1 |   | 5/2012 | Bryant | |

OTHER PUBLICATIONS

International Search Report and Written Opinion correlating to PCT/US2013/067848 dated Apr. 24, 2014, 7 pages.

* cited by examiner

*Primary Examiner* — Reginald Bragdon
*Assistant Examiner* — Mehdi Namazi (57) ABSTRACT

A method is provided for executing a cacheable store. The method includes determining whether to replay a store instruction to re-acquire one or more cache lines based upon a state of the cache line(s) and an execution phase of the store instruction. The store instruction is replayed in response to determining to replay the store instruction. An apparatus is provided that includes a store queue (SQ) configurable to determine whether to replay a store instruction to re-acquire one or more cache lines based upon a state of the cache line(s) and an execution phase of the store instruction. Computer readable storage devices for adapting a fabrication facility to manufacture the apparatus are provided.

17 Claims, 6 Drawing Sheets

STORE REPLAY POLICY

BACKGROUND

1. Technical Field

Embodiments presented herein relate generally to computing systems and processing devices, and, more particularly, to a method and apparatus for implementing a cacheable store replay policy in a processing device.

2. Description of Related Art

Electrical circuits and devices that execute instructions and process data have evolved becoming faster and more complex. With the increased performance and low power demands of modern data processor architectures (e.g., multi-core processors), committing (i.e., writing) new data (i.e., a cacheable store) to data caches has become more complex. Designing a processor capable of efficiently committing new data, while avoiding problematic conditions including contention and live-lock states, as well as power consuming events such as cache lines being repeatedly acquired by different processor cores, is particularly problematic.

In some previous solutions, acquisitions of cache lines and commits of cacheable stores were attempted after simply waiting for the cacheable store to become the oldest cacheable store in the system. In other cases, acquisitions of cache lines and commits of cacheable stores were attempted after the cacheable store was retired, and counters were implemented such that after a certain number of attempts, further attempts of acquisitions and commits of cacheable stores were performed only after the cacheable store became the oldest cacheable store in the system. These previous solutions, however, suffer from poor performance and inefficient power utilization.

Embodiments presented herein eliminate or alleviate the problems inherent in the state of the art described above.

SUMMARY OF EMBODIMENTS

In some embodiments, a method is provided. The method includes executing a cacheable store. Some embodiments of the method includes determining whether to replay a store instruction to re-acquire one or more cache lines based upon a state of the store instruction indicated by status of the cache line(s) and an execution phase of the store instruction. The store instruction is replayed in response to determining to replay the store instruction. An apparatus is provided that includes a store queue (SQ) configurable to determine whether to replay a store instruction to re-acquire one or more cache lines based upon a state of the store instruction indicated by status of the cache line(s) and an execution phase of the store instruction. Computer readable storage devices for adapting a fabrication facility to manufacture the apparatus are provided.

BRIEF DESCRIPTION OF THE DRAWINGS

The embodiments herein may be understood by reference to the following description taken in conjunction with the accompanying drawings, in which the leftmost significant digit(s) in the reference numerals denote(s) the first figure in which the respective reference numerals appear, and in which.

While the embodiments herein are susceptible to various modifications and alternative forms, specific embodiments thereof have been shown by way of example in the drawings and are herein described in detail. It should be understood, however, that the description herein of specific embodiments is not intended to limit the disclosed embodiments to the particular forms disclosed, but, on the contrary, the intention is to cover all modifications, equivalents, and alternatives falling within the scope of the disclosed embodiments as defined by the appended claims.

DETAILED DESCRIPTION

Illustrative embodiments of the instant application are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and/or business-related constraints, which may vary from one implementation to another. Moreover, it will be appreciated that such a development effort might be complex and time-consuming, but may nevertheless be a routine undertaking for those of ordinary skill in the art having the benefit of this disclosure.

Embodiments of the present application will now be described with reference to the attached figures. Various structures, connections, systems and devices are schematically depicted in the drawings for purposes of explanation only and so as to not obscure the disclosed subject matter with details that are well known to those skilled in the art. Nevertheless, the attached drawings are included to describe and explain illustrative examples of the present embodiments. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

As used herein, the terms "substantially" and "approximately" may mean within 85%, 90%, 95%, 98% and/or 99%. In some cases, as would be understood by a person of ordinary skill in the art, the terms "substantially" and "approximately" may indicate that differences, while perceptible, may be negligent or be small enough to be ignored. Additionally, the term "approximately," when used in the context of one value being approximately equal to another, may mean that the values are "about" equal to each other. For example, when measured, the values may be close enough to be determined as equal by one of ordinary skill in the art.

As discussed herein, data may be "maintained," "held," "kept" and/or "stored" in various data storage structures including, but not limited to, queues, memories, caches, buffers, registers, flip-flops, and/or the like. The terms "maintained," "held," "kept" and/or "stored" may be used synonymously and interchangeably herein.

As discussed herein, a "cacheable store" may be one or more groups of data or data elements that are to be stored in a cache (e.g., an L1 data cache or an L2 data cache, though not so limited) of a processing device (e.g., single- and multi-core microprocessors (CPUs) and graphics processors (GPUs), or their respective individual processing cores). As discussed herein, a "cacheable store" may be committed or written to the cache in which it is to be stored. As described herein, a "cacheable store" may be executed one or more times to accomplish its store in a cache. A subsequent execution to acquire the cache line of the cacheable store may be referred to as a "replay" or a "re-execution". An execution of a cacheable store may also be referred to as a "pick" during which the cacheable store is chosen and processed through an execution pipeline of a CPU, or the like, as would be apparent to one of ordinary skill in the art having the benefit of this disclosure.

Embodiments presented herein generally relate to a method and apparatus for implementing a cacheable store replay policy in a processing device. As noted above, processing devices (e.g., single- and multi-core microprocessors (CPUs) and graphics processors (GPUs), or their respective individual processing cores) may execute cacheable stores in order to write new data to a cache. In order to do so, a cacheable store may require that its cache line be present in the cache (e.g., a data cache) and be in a writeable state. However, a cache line that was present when the cacheable store began execution may not be in the cache when the cacheable store attempts to commit the cache line by writing the new data into the cache. For example, the cache line of a cacheable store may be probed out of a cache by other CPUs, other CPU cores, and/or other devices in the system during the execution of a cacheable store. In order to write the data to the cache, the cacheable store may be required to re-acquire the cache line—this is known as performing a replay. During an initial execution or a replay of the cacheable store, the cacheable store may be kept in a store queue (SQ) where various states and/or attributes of the cacheable store may be tracked, such as its data, its memory address, results of executions or replays, and/or the like. Further, replays of cacheable stores may be performed in accordance with one or more replay policies, as are discussed in further detail herein.

The embodiments described herein allow for efficient executions and replays of cacheable stores by performing executions and replays in accordance with replay policies that balance early acquisitions of cache lines against system contention factors. In some embodiments, the specific replay policies are linked to, or dependent upon, various phases of execution of the cacheable store. In some embodiments, the system determines whether to replay a store to re-acquire at least one cache line for the store based upon a state of the cache line and an execution phase of the store. For example, the system may decide whether to replay a store depending on whether the store has completed, retired, or become the oldest store in the store queue. The system may also determine whether to replay the store based upon at least one result of at least one previous replay of the store. For example, replays may be characterized as "good replays" when the replay changes the state of the cache line to a state that is closer to a writable state that allows the store to commit. Replays may be characterized as "bad replays" when they do not change the state of the cache line to a state that is closer to the writable state. Stores may be replayed until they have a configurable number of good replays. Alternatively, stores may be replayed as often as necessary, e.g., until the cache line is in a writable state. However, other policies may alternatively be used to determine whether to replay a store.

Figure 1:
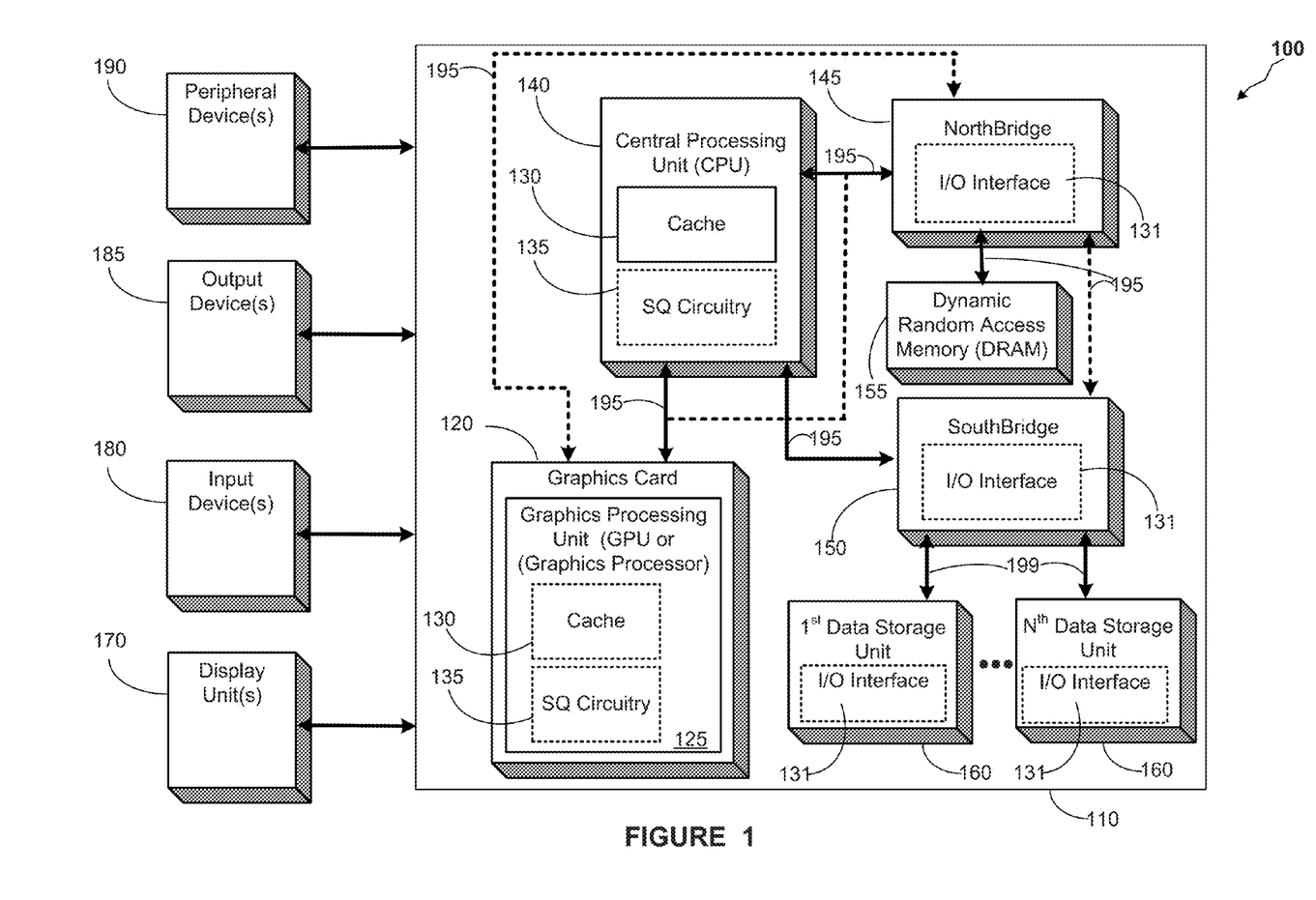
FIG. 1 schematically illustrates a simplified block diagram of a computer system, according to some embodiments.

Turning now to FIG. 1, a block diagram of a computer system 100, in accordance with some embodiments, is illustrated. In various embodiments the computer system 100 may be a personal computer, a laptop computer, a handheld computer, a tablet computer, a mobile device, a telephone, a personal data assistant ("PDA"), a server, a mainframe, a work terminal, a music player, a smart television, and/or the like, all of which may be referred to generically as processing devices. The computer system 100 includes a main structure 110 which may be a computer motherboard, circuit board or printed circuit board, a desktop computer enclosure and/or tower, a laptop computer base, a server enclosure, part of a mobile device, personal data assistant (PDA), or the like. In some embodiments, the main structure 110 includes a graphics card 120. The graphics card 120 may be a Radeon™ graphics card from Advanced Micro Devices ("AMD") or any other graphics card using memory. The graphics card 120 may be connected on a Peripheral Component Interconnect "(PCI") Bus (not shown), PCI-Express Bus (not shown) an Accelerated Graphics Port ("AGP") Bus (also not shown), or any other computer system connection. It should be noted that embodiments of the present application are not limited by the connectivity of the graphics card 120 to the main computer structure 110. In some embodiments, the computer system 100 runs an operating system such as Linux®, UNIX®, Windows®, Mac OS®, and/or the like. In one or more embodiments, the computer system 100 may include one or more system registers (not shown) adapted to store values used by the computer system 100 during various operations.

In some embodiments, the graphics card 120 includes a processing device such as a graphics processing unit (GPU) 125 used in processing graphics data. The GPU 125 may include one or more embedded/non-embedded memories, such as one or more caches 130. The GPU caches 130 may be L1, L2, higher level, graphics specific/related, instruction, data and/or the like. In various embodiments, the embedded memory(ies) may be an embedded random access memory ("RAM"), an embedded static random access memory ("SRAM"), or an embedded dynamic random access memory ("DRAM"). In some embodiments, the memory(ies) may be on the graphics card 120 in addition to, or instead of, being embedded in the GPU 125, for example as DRAM 155 on the graphics card 120 as shown in FIG. 1. In various embodiments the graphics card 120 may be referred to as a circuit board or a printed circuit board or a daughter card or the like.

In some embodiment, the computer system 100 includes a processing device such as a central processing unit ("CPU") 140, which may be connected to a northbridge 145. In various embodiments, the CPU 140 may be a single- or multi-core processor, or may be a combination of one or more CPU cores and a GPU core on a single die/chip (such an AMD Fusion™ APU device). The CPU 140 may be of an x86 type architecture, a RISC type architecture, and/or the like. In some embodiments, the CPU 140 includes one or more caches 130, such as, but not limited to, L1, L2, level 3 or higher, data, instruction and/or other cache types. In some embodiments, the CPU 140 is a pipe-lined processor. The CPU 140 and northbridge 145 may be housed on the motherboard (not shown) or some other structure of the computer system 100. It is contemplated that in some embodiments, the graphics card 120 is coupled to the CPU 140 via the northbridge 145 or some other computer system connection. For example, CPU 140, northbridge 145, GPU 125 may be included in a single package or as part of a single die or "chips" (not shown) or as a combination of packages. Some embodiments which alter the arrangement of various components illustrated as forming part of main structure 110 are also contemplated. In some embodiments, the northbridge 145 may be coupled to a system RAM (or DRAM) 155; in some embodiments, the system RAM 155 may be coupled directly to the CPU 140. The system RAM 155 may be of any RAM type known in the art and may comprise one or more memory modules; the type of RAM 155 does not limit the embodiments of the present application. For example, the RAM 155 may include one or more DIMMs. As referred to in this description, a memory may be a type of RAM, a cache or any other data storage structure referred to herein.

In some embodiments, the northbridge 145 is connected to a southbridge 150. In some embodiments, the northbridge 145 and southbridge 150 are on the same chip in the computer system 100. In some embodiments, the northbridge 145 and southbridge 150 are on different chips. In some embodiments, the southbridge 150 has one or more I/O interfaces 131, in addition to any other I/O interfaces 131 elsewhere in the computer system 100. In various embodiments, the southbridge 150 may be connected to one or more data storage units 160 using a data connection or bus 199. The data storage units 160 may be hard drives, solid state drives, magnetic tape, or any other writable media used for storing data. In some embodiments, one or more of the data storage units is USB storage units and the data connection 199 is a USB bus/connection. Additionally, the data storage units 160 may contain one or more I/O interfaces 131. In various embodiments, the central processing unit 140, northbridge 145, southbridge 150, graphics processing unit 125, DRAM 155 and/or embedded RAM may be a computer chip or a silicon-based computer chip, or may be part of a computer chip or a silicon-based computer chip. In one or more embodiments, the various components of the computer system 100 may be operatively, electrically and/or physically connected or linked with a bus 195 or more than one bus 195.

In some embodiments, the computer system 100 may include store queue (SQ) circuitry 135. In some embodiments, the SQ circuitry 135 includes a store queue (SQ) and related components adapted or configured to provide functionality for executing and replaying cacheable stores in the computer system 100, the CPU 140, the GPU 125, and/or their respective core(s). In some embodiments, components adapted to provide functionality for determining and performing exaction and replays reside in other system blocks, e.g., a retirement unit, re-order buffer (ROB) unit, a missed address buffer (MAB), a translation look-aside buffer (TLB), a load-store (LS) unit, an address generation unit (AGU), and/or the like), or in a combination of the SQ circuitry 135 and other system blocks. The components of the SQ circuitry 135 are discussed in further detail below, in FIG. 4. The SQ circuitry 135 may comprise a silicon die/chip and include software, hardware and/or firmware components. In some embodiments, the SQ circuitry 135 is packaged in a silicon die package or electronic component package. In some embodiments, the SQ circuitry 135 is a circuit included in an existing computer component, such as, but not limited to, the CPU 140, the northbridge 145, the graphics card 120 and/or the GPU 125 (or any respective cores of these components). In some embodiments, SQ circuitry 135 is communicatively coupled to the CPU 140, the GPU 125, the northbridge 145, the RAM/DRAM 155 and/or their respective connections 195. As used herein, the terms "SQ circuitry" or "SQ" (e.g., SQ circuitry 135) may be used to refer a physical SQ chip or to SQ circuitry included in a computer component, to circuitry of the SQ circuitry 135, or to the functionality implemented by the SQ. The SQ circuitry 135 may function as, and/or be referred to as, a portion of a processing device. In some embodiments, some combination of the GPU 125, the CPU 140, the SQ circuitry 135 and/or any hardware/software computer 100 units respectively associated therewith, may collectively function as, and/or be collectively referred to as, a processing device. In some embodiments, the CPU 140 and SQ circuitry 135, the GPU 125 and the SQ circuitry 135, or the CPU 140, the northbridge 145 and the SQ circuitry 135 and their respective interconnects may function as a processing device.

In some embodiments, the computer system 100 is connected to one or more display units 170, input devices 180, output devices 185 and/or other peripheral devices 190. It is contemplated that in various embodiments, these elements may be internal or external to the computer system 100, and may be wired or wirelessly connected, without affecting the scope of the embodiments of the present application. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier or other output device. The peripheral devices 190 may be any other device which can be coupled to a computer: a CD/DVD drive capable of reading and/or writing to corresponding physical digital media, a universal serial bus ("USB") device, a non-volatile memory, Zip Drive, external floppy drive, external hard drive, phone and/or broadband modem, router/gateway, access point and/or the like. The input, output, display and peripheral devices/units described herein may have USB connections in some embodiments. To the extent certain exemplary aspects of the computer system 100 are not described herein, such exemplary aspects may or may not be included in various embodiments without limiting the spirit and scope of the embodiments of the present application as would be understood by one of skill in the art.

Figure 2:
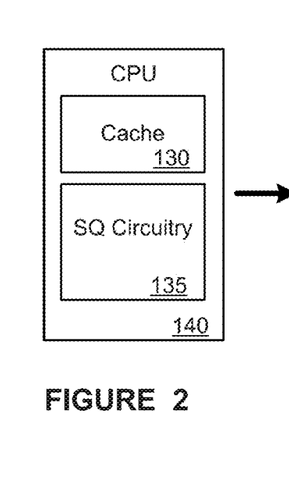
FIG. 2 shows a simplified block diagram of a circuit that includes a central processing unit (CPU) and store queue (SQ) circuitry, according to some embodiments.

Turning now to FIG. 2, a block diagram of example SQ circuitry 135, CPU 140 and/or northbridge 145, in accordance with some embodiments, is illustrated. In some embodiments, the SQ circuitry 135, CPU 140 and/or northbridge 145 contain one or more caches 130. The SQ circuitry 135, CPU 140 and/or northbridge 145, in some embodiments, include L1, L2 or other level caches 130. To the extent certain exemplary aspects of the SQ circuitry 135, CPU 140 and/or northbridge 145 and/or one or more caches 130 are not described herein, such exemplary aspects may or may not be included in various embodiments without limiting the scope of the embodiments of the present application as would be understood by one of skill in the art.

Figure 3A:
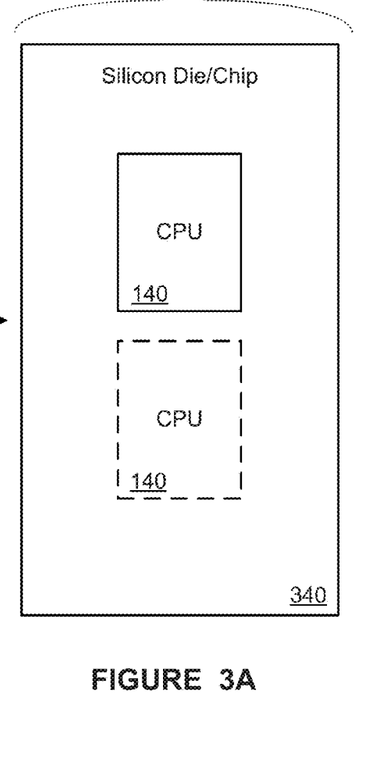
FIG. 3A provides a representation of a silicon die/chip that includes one or more circuits as shown in FIG. 2, according to some embodiments.

Turning now to FIG. 3A, in some embodiments, the SQ circuitry 135, CPU 140 and/or northbridge 145 and the cache(s) 130 may reside on a silicon chips/die 340 and/or in the computer system 100 components such as those depicted in FIG. 1. The silicon chip(s) 340 may be housed on the motherboard (e.g., 110) or other structure of the computer system 100. In some embodiments, there may be more than one SQ circuitry 135, CPU 140 and/or northbridge 145 and/or caches 130 on each silicon chip/die 340. As discussed above, various embodiments of the SQ circuitry 135, CPU 140 and/or northbridge 145 may be used in a wide variety of electronic devices.

Figure 3B:
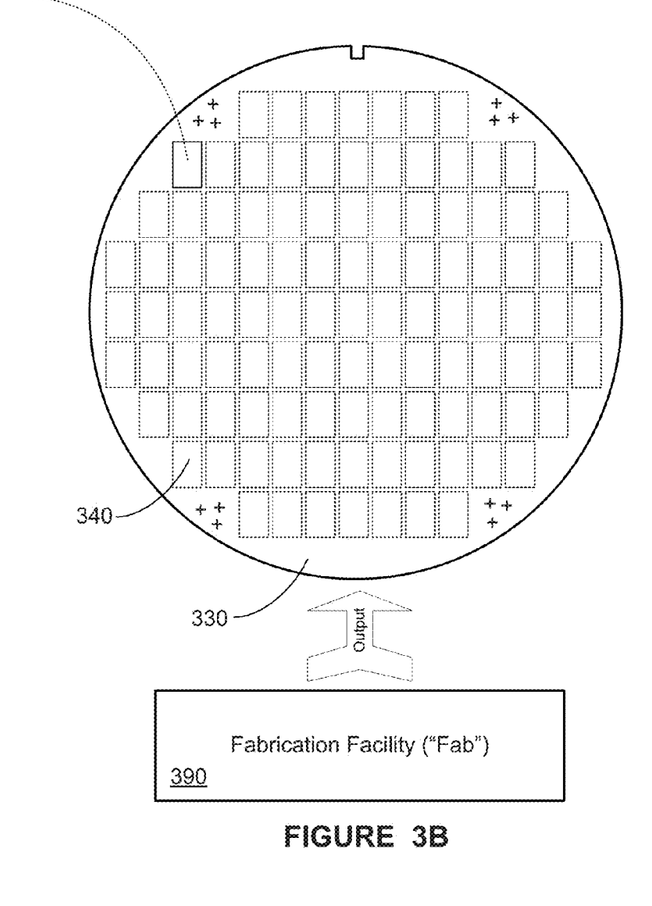
FIG. 3B provides a representation of a silicon wafer which includes one or more die/chips that may be produced in a fabrication facility, according to some embodiments.

Turning now to FIG. 3B in accordance with some embodiments, and as described above, one or more of the SQ circuitry 135, CPU 140 and/or northbridge 145 may be included on the silicon die/chips 340 (or computer chip). The silicon die/chips 340 may contain one or more different configurations of the SQ circuitry 135, CPU 140 and/or northbridge 145. The silicon chips 340 may be produced on a silicon wafer 330 in a fabrication facility (or "fab") 390. That is, the silicon wafers 330 and the silicon die/chips 340 may be referred to as the output, or product of, the fab 390. The silicon die/chips 340 may be used in electronic devices, such as those described above in this disclosure.

Figure 4:
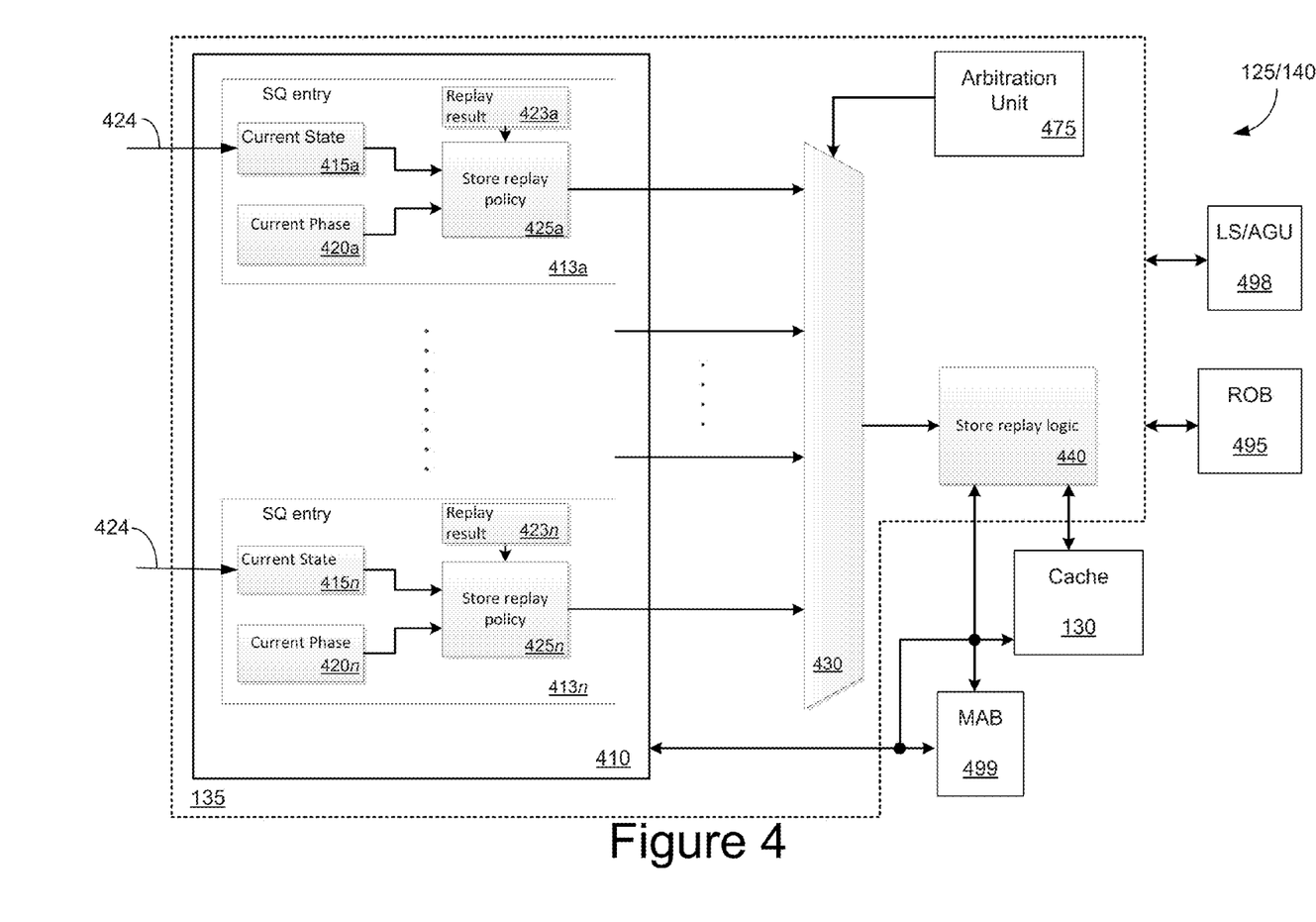
FIG. 4 illustrates a simplified block diagram of store queue (SQ) circuitry of FIG. 2 in the context of a computer processor, according to some embodiments.

Turning now to FIG. 4, a graphical representation of the SQ circuitry 135 and accompanying circuitry, in accordance with some embodiments, is shown. In various embodiments, the accompanying circuitry (e.g., a store queue (SQ) 410, a selection unit 430, a replay unit 440, an arbitration unit 475, etc., as well as their respective interconnections) may be included as part of the SQ circuitry 135 and referred to as such. In some embodiments, the SQ circuitry 135 may be part of a CPU 140, a GPU 125, and/or their respective core(s). The SQ circuitry 135 may be communicatively coupled to a cache 130 (e.g., an L1 data cache and/or and L2 data cache), to a TLB 485, and to a re-order buffer 495 (ROB). The cache 130, the TLB 485, and the ROB 495, as well as additional CPU 140 and/or GPU 125 components (not shown) related to the execution of cacheable stores, are not described in detail herein, but would generally be understood by one of ordinary skill in the art having the benefit of this disclosure.

The SQ circuitry 135 may include a store queue (SQ) 410, in some embodiments. The SQ 410 may include one or more entries 413a-n configured to hold or maintain one or more cacheable stores during the execution thereof. The SQ 410 may be coupled to the selection unit 430 in a manner such that the entries 413a-n may each be respectively connected to an input of the selection unit 430, and the control of and selection performed by the selection unit 430 may be performed in response to an input signal received from the arbitration unit 475. Each SQ entry 413a-n may include one or more state units 415a-n, one or more phase units 420a-n, one or more replay result units 423a-n, and one or more replay policy units 425a-n. As shown in FIG. 4, the state units 415a-n, the phase units 420a-n, and the replay result units 423a-n may be connected to respective replay policy units 425a-n, and may be configured to provide their respective data thereto.

A state unit 415 may be configured to maintain current and/or past state data associated with a cacheable store. In some embodiments, the status of the cacheable store is determined by the state of the cache line (or lines) the store intends to write. For example, the state may indicate that the cache line is writeable, being filled, or is unknown and so the corresponding cacheable store may need to be replayed. In the writable state, the cacheable store's cache line is present in the L1 data cache in a writeable state. In the fill pending state, the store's cache line is not currently present in a writeable state, but the cache line is in the process of being acquired. For example, the cache line of the cacheable store may not be present or not be in a writeable state in the cache 130, but a miss address buffer (MAB) 499 may have been allocated to acquire the cache line. In the unknown state, the store's cache line is not currently present in a writeable state and is not being actively acquired, perhaps because the cacheable store does not know that the cache line is writeable. For example, the cache line of the cacheable store may not be present or not be in a writeable state in the cache 130 and a miss address buffer (MAB) 499 may not have been allocated to acquire the cache line. In this state, the cacheable store may need to be replayed. The state may be updated on either a replay or from a probe 424. The illustrated of the state 415 may implement a state machine that is used to determine the state of the cacheable store, according to some embodiments.

Figure 7:
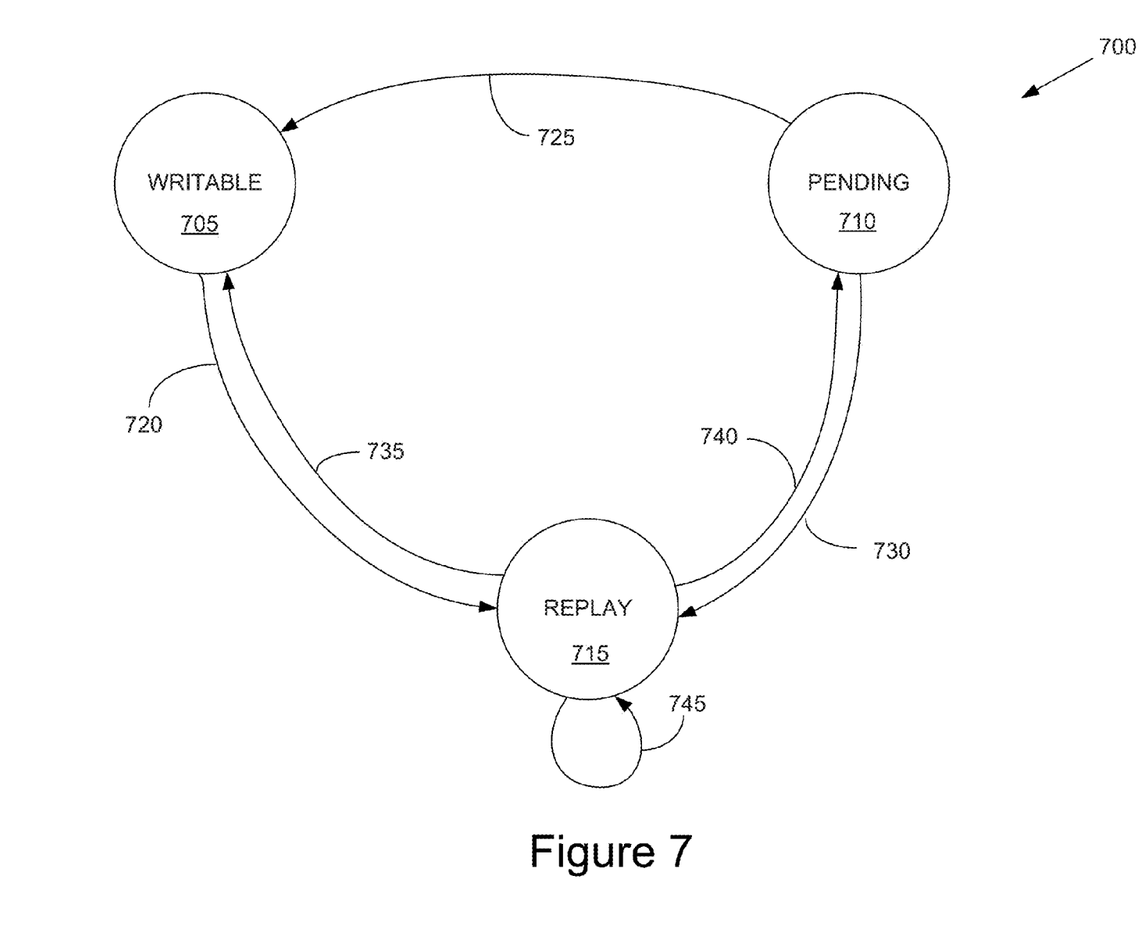
FIG. 7 conceptually illustrates an example of a state machine that may be implemented in the store queue shown in FIG. 4.

FIG. 7 conceptually illustrates an example of a state machine 700 that may be implemented in the state unit 415 shown in FIG. 4. The state machine 700 includes a writeable state 705, a pending state 710, and a replay state 715. A cacheable store in the writeable state 705 may transition (at 720) to the replay state 715 in response to a probe of the cache line associated with the cacheable store. A cacheable store in the pending state 710 may transition (at 725) to the writeable state 705 in response to a successful fill of the cache line associated with the cacheable store. The cacheable store in the fill pending state 710 may transition (at 730) to the replay state 715 in response to a fill return that doesn't return a writeable cache line. A cacheable store in the replay state 715 may transition (at 735, 740, or 745) to the writeable state 705, the pending state 710, or the replay state 715 depending on the results of a replay of the cacheable store. Replays that cause transitions (at 735 or 740) out of the replay state 715 to either the writable state 705 or the pending state 710 may be referred to as "good replays" because the replay placed the cacheable store in a better state than its previous state (e.g., the cacheable store may be closer to being committed). A "bad replay" does not place the cacheable store in a better state than its previous state (e.g., the cacheable store may not be closer to being committed). If the replay results in a "bad replay," a subsequent replay may be needed and/or performed on a cacheable store.

Referring back to FIG. 4, a phase unit 420 may be configured to maintain current execution phase associated with a cacheable store. The different phases associated with the execution of the cacheable store are discussed in further detail with respect to FIG. 5 below. A replay result unit 423 may be configured to maintain one or more replay results associated with the execution of the cacheable store, as exemplarily described above. During and/or after a replay is complete, the data in the state units 415, the phase units 420, and the replay results unit 423 may be updated in accordance with the replay result(s) and/or other information related to the execution of the cacheable store. The updated data may be transmitted to the SQ 410, for example, by an element of the SQ circuitry 135, by the TLB 485, by the cache 130, by a load-store unit (e.g., LS/AGU 498), or by any other appropriate element in the processor (e.g., CPU 140/GPU 125/core(s)) or system (e.g., computer system 100).

Still referring to FIG. 4 and in one or more embodiments, a replay policy unit 425 may be configured to store a replay policy for performing replays or re-executions of a cacheable store. Data from the state units 415a-n, the phase units 420a-n, and the replay result units 423a-n may be provided to respective replay policy units 425a-n where the data may be used by the replay policy units 425a-n to determine if the cacheable store associated with a given entry 413 is eligible for a replay or re-execution in accordance with the replay policies described herein. If it is determined that the cacheable store is eligible for a replay, the replay policy unit(s) 425 may output a signal indicative of this determination to the select unit 430, and a cacheable store associated with the entry 413 in which the determination was made may be selected using the select unit 430.

It should be understood that a single replay policy unit 425a (configured to implement one or more cacheable store replay policies) may be utilized by the one or more SQ entries 413a-n. That is, the one or more entries 413a-n may each have its own replay policy unit 425a, or may share a replay policy unit 425a with one or more other entries 413a-n. It is also contemplated that a plurality of replay policy units 425a-n may concurrently implement one or more different replay policies. In one or more embodiments, the one or more replay policies implemented may be selectable by system software, may be hardwired into the replay policy units 425a-n, or may be otherwise implemented as would be understood by a person of ordinary skill in the art having the benefit of this disclosure. The one or more replay policies may be changed, according to design and/or operational considerations, at system boot, dynamically, or at other appropriate times, in accordance with various embodiments.

According to one or more embodiments, the SQ 410 may be configured to maintain a misaligned cacheable store (i.e., a cacheable store that crosses a cache line boundary). In such a case, the SQ 410 may include a duplicate entry $413a_2$-$n_2$ (not shown) to be grouped with each entry 413a-n effectively doubling the storage capacity of each entry 413 (e.g., an entry 413a and an entry $413a_2$ for each half of a misaligned cacheable store respectively). The execution of a misaligned cacheable store may be formed in a commensurate manner as described with respect to aligned (normal) cacheable stores herein. It should be noted that each half of the misaligned cacheable store may be executed and/or replayed together, independently, substantially in parallel, or in an overlapping manner. Similarly, the commit for each half may be performed simultaneously, concurrently, or in non-overlapping intervals or cycles.

The selection unit 430 may be or include a multiplexor with one or more selectable inputs, or may be circuitry configured to select an input from the SQ 410 based on a selection signal. In some embodiments, the selection signal is provided to the selection unit 430 by the arbitration unit 475. The arbitration unit 475 may provide the selection signal based upon one or more arbitration algorithms, including but not limited to, a fairness algorithm (e.g., round-robin arbitration), an age-based arbitration, or an implementation-specific algorithm. In some embodiments, the one or more arbitration algorithms may be selectable by system software, may be hardwired into the arbitration unit 475, or may be otherwise implemented as would be understood by a person of ordinary skill in the art having the benefit of this disclosure. The one or more arbitration algorithms may be changed, according to design and/or operational considerations, at system boot, dynamically, or at other appropriate times, in accordance with various embodiments.

The replay logic unit 440 may be configured with logic to perform and/or facilitate execution and/or replays of cacheable stores. In various embodiments, this may be performed according to the one or more replay policies described herein. The replay logic unit 440 may receive an input (e.g., a cacheable store to be executed and/or replayed) from the selection unit 430. The replay logic unit 440 may also be configured to communicate with the cache 130, MAB 499 and/or the ROB 495, as will be discussed in further detail below, as well as with other appropriate elements in the processor (e.g., CPU 140/GPU 125/core(s)) or system (e.g., computer system 100).

Figure 5:
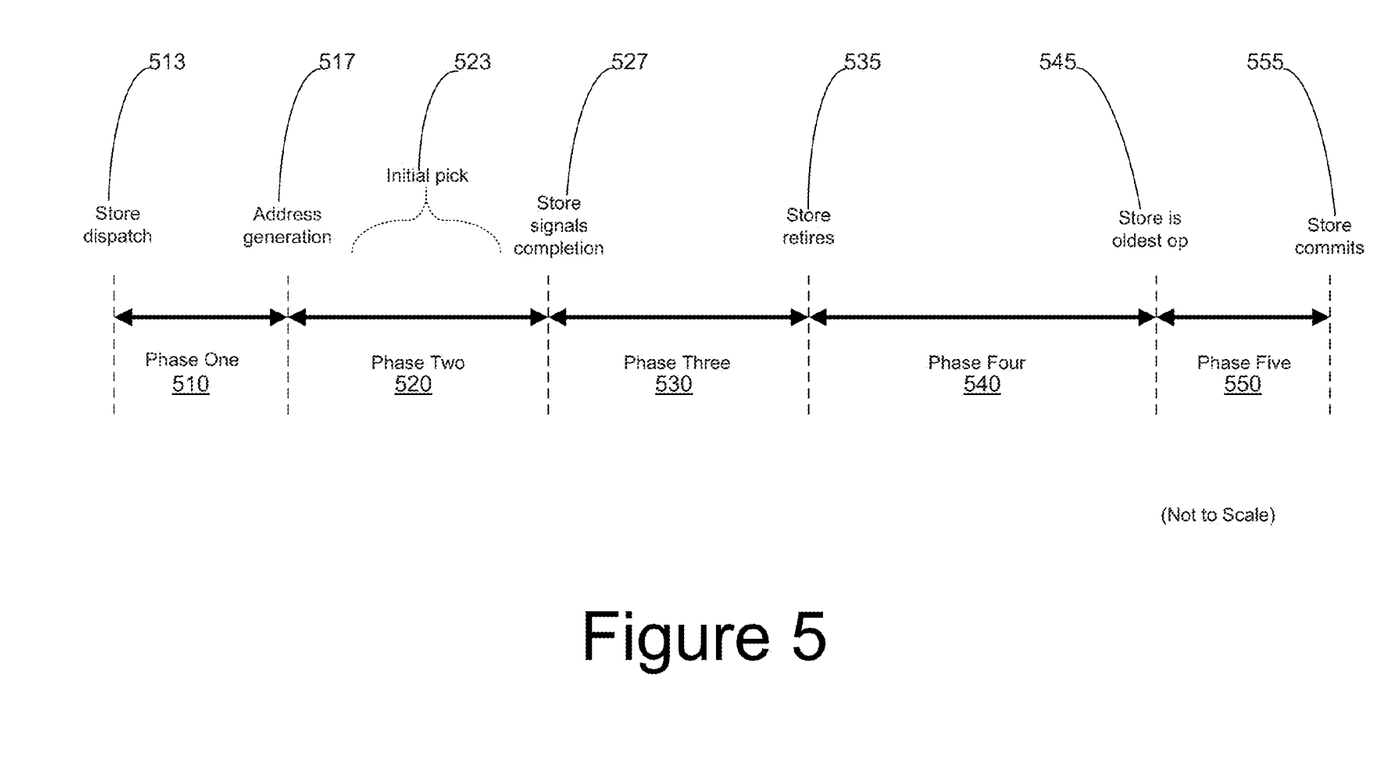
FIG. 5 illustrates a simplified timeline of the execution of a cacheable store, according to some embodiments.

Turning now to FIG. 5, a simplified timeline of the execution of a cacheable store as in one or more embodiments is shown. The execution of a cacheable store may include one or more phases. A phase may be a portion of the execution that may be defined by different events during the execution. While not so limited, an example execution by phase is now described in accordance with one embodiment. An execution of a cacheable store may begin at phase one 510 when the cacheable store is first dispatched to a load-store unit (e.g., LS/AGU 498). During phase one 510, the cacheable store may be waiting for its linear address to be generated, for example, by an address generation unit (AGU) (not shown). Phase two 520 may start once the cacheable store has an address and may last until the cacheable store signals completion to the ROB 495. During phase two 520, the cacheable store may have its "initial pick" at which time the cacheable store determines whether it's associated cache line is present. Phase three 530 may start after the completion of the TLB 485 lookup and may last until the ROB 495 indicates that the cacheable store has retired. During phase three 530, the cacheable store may still be considered speculative. Phase four 540 may occur between the retirement of the cacheable store, and when the cacheable store becomes the absolute oldest cacheable store in the system. The SQ 410 may be configured, as described above, to hold or maintain many cacheable stores in this post-retire state (e.g., after the beginning of phase four 540), and for architectural reasons, the cacheable store may be required to be committed in order. To this end, during phase four 540, the cacheable store may wait until it is the oldest cacheable store in the system. It is contemplated that if no older cacheable stores are present in the system, a cacheable store may skip directly from phase three 530 to phase five 550. Phase five 550 may start once the cacheable store is the oldest cacheable store, and May last until the cacheable store commits (writes data to the cache), at which point the cacheable store may be deleted from the SQ 410.

It should be noted that the timeline depicted in FIG. 5 is not necessarily drawn to scale and that different phases of an execution or replay may be shorter or longer than shown. In some embodiments, however, the relative duration of the phases may be approximately equal to those shown in FIG. 5. Additionally, the different phases of an execution may be skipped or repeated in accordance with a processor's architectural rules and requirements.

Figure 6:
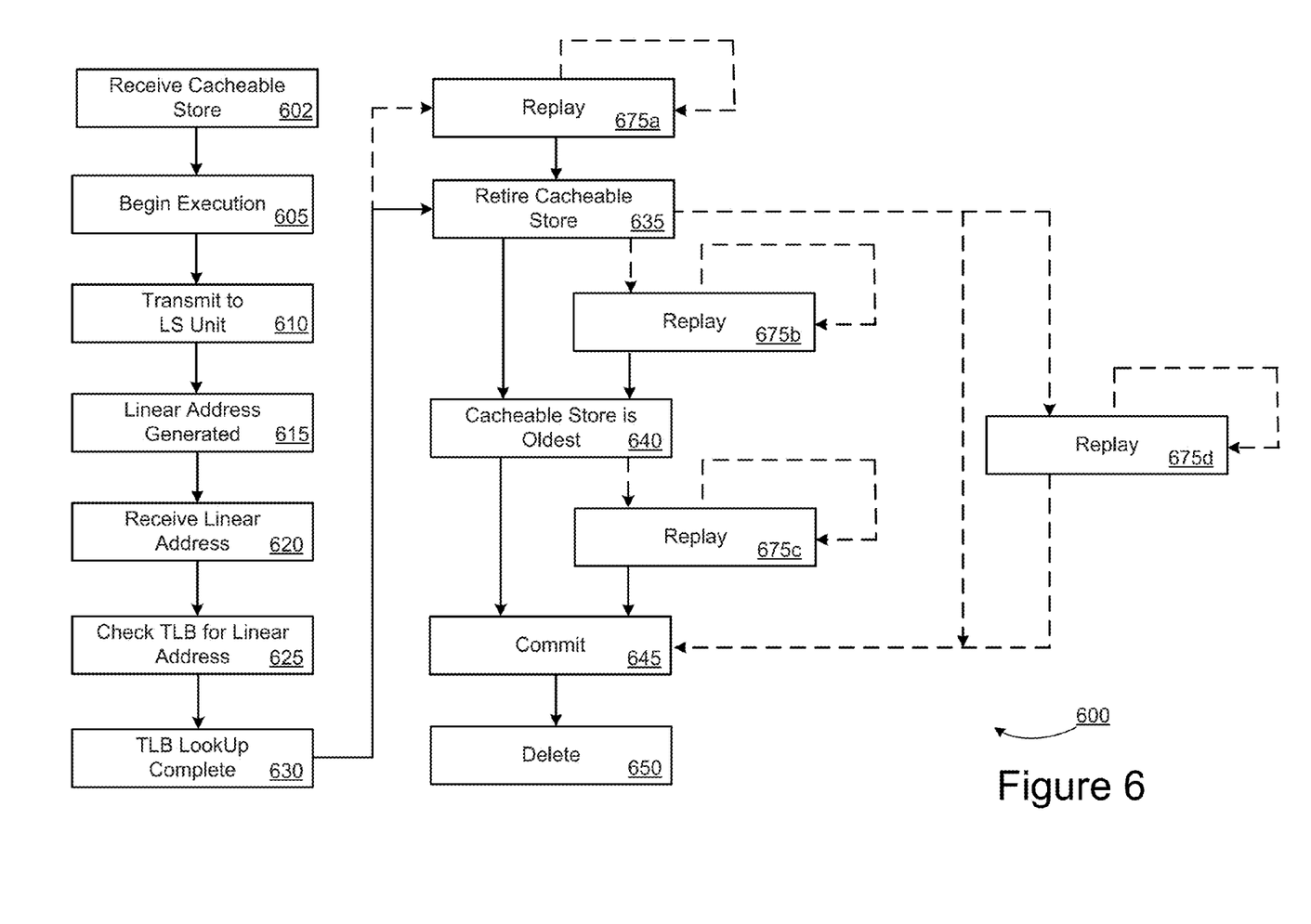
FIG. 6 illustrates a flowchart depicting executing a cacheable store in accordance with a replay policy, according to some embodiments.

Turning now to FIG. 6, an exemplary flowchart 600 depicting execution and replays of cacheable stores, in some embodiments, is shown. The execution and replay of a cacheable store, as shown in FIG. 6, may be performed according to the embodiments and replay policies described herein. Further, as noted above, one of ordinary skill in the art having the benefit of this disclosure, will realize that the flow and embodiments described herein may be modified to accommodate misaligned cacheable stores as well.

At 602, a cacheable store may be received in a processing device for execution. The cacheable store may be received at the SQ 410 described in FIG. 4 and/or at other elements of a processing device necessary to perform the execution of the cacheable store. In some embodiments, the SQ 410 may hold or maintain the cacheable store during its execution through the processing device or processing device execution pipeline. At 605, execution of the cacheable store may begin, and the flow may proceed to 610 where the cacheable store may be dispatched to a load-store unit (e.g., LS/AGU unit 498) where a linear address for the cacheable store may be generated by an address generation unit (e.g., LS/AGU unit 498) at 615. The flow may proceed to 620 where the linear address is received by, for example, the SQ 410. At 625, the TLB may determine if a TLB entry exists for the linear address of the cacheable store. Once the TLB lookup is complete at 630, the execution flow may proceed to 635 where an ROB (e.g., ROB 495) may indicate that the cacheable store has been retired. Alternatively, from 630, the flow may proceed to 675a where one or more replays may be performed according to the various replay policies described herein. In some embodiment, the replay(s) at 675a may be repeated in response to their initial pick (in phase 2) being a bad replay until they have performed a configurable number of good replays. For example, the stores in this phase may be replayed until they have performed one good replay. After performing the one good replay, the store may not be allowed to replay again until it has retired.

From 675a, the flow may proceed to 635 for retiring of the cacheable store.

From 635, the flow may proceed to 640 where the cacheable store waits until it is the oldest cacheable store in the system. Alternatively, from 635, the flow may proceed to 675b where one or more replays may be performed. In some embodiments, the replay(s) at 675b may be repeated until they have performed a configurable number of good replays, regardless of any replay results for replays attempted before the store retired. For example, the stores in this phase may be replayed until they have performed one good replay. After performing the one good replay, the store may not be allowed to replay again until the store becomes the oldest store the store queue.

From 675b, the flow may proceed to 640 where the cacheable store waits until it is the oldest cacheable store in the system.

From 640, when the cacheable store is the oldest cacheable store, the flow may proceed to 645 where the data associated with the cacheable store is committed, or written to, a cache (e.g., cache 130). Alternatively, from 640, the flow may proceed to 675c where one or more replays may be performed. In some embodiments, the replay(s) at 675c is repeated as often as necessary, e.g., until the cache line is in a writable state. From 675c, the flow may proceed to 645 where the data associated with the cacheable store is committed, or written to, a cache. It should be noted that if no other cacheable stores are present, the flow may proceed from 635 to 645 without the cacheable store waiting to become the oldest cacheable store at 640. It is also contemplated that when skipping 640, as described above, the flow may proceed to 675d before continuing on to 645. At 675d, one or more replays may be performed according to the various replay policies described herein or other replay policies. The replay(s) at 675c may be repeated as required by the replay policies. From 645, once the data has been committed to the cache, the flow may proceed to 650 where the cacheable store is deleted from the SQ (e.g., SQ 410).

In some embodiments, aspects of the replay policies may be configured using stored information such as bits or registers in the store queue. For example, the configurable number of replays allowed during replays 675a-d may be stored in one or more bits or registers. The configurable number of replays may be the same for each of the replay 675a-d or may be different for one or more replays 675a-d. The bits or registers may be made software visible so that they can be read or modified by the software. Persons of ordinary skill in the art having benefit of the present disclosure should also appreciate that the replays 675a-d described herein are intended to be examples. Alternative embodiments may use other replay policies to determine whether to replay a store instruction based upon a state of the store indicated by a status of one or more cache lines and an execution phase of the store.

It is contemplated that the elements as shown in FIG. 6 may not be limited to the order in which they are described above.

In accordance with some embodiments, the elements shown in FIG. 6 may be performed sequentially, in parallel, or in alternate order(s) without departing from the spirit and scope of the embodiments presented herein. It is also contemplated that the flowcharts may be performed in whole, or in part(s), in accordance with one or more embodiments presented herein. That is, the flowcharts shown in the Figures need not perform every element described in one or more embodiments. Some embodiments of the methods illustrated in FIG. 6 may be implemented in hardware, firmware, software, or combinations thereof. Transitory or non-transitory computer readable media may be used to store instructions that when executed can configure a processing system to implement or execute some embodiments of the methods described herein. For example, encoded instructions representative of some embodiments of the methods described herein may be stored on a non-transitory computer readable storage device, e.g., data storage units, RAMs including embedded RAMs, SRAMs or DRAMs, caches, compact discs, DVDs, solid state storage devices or other storage media.

Further, it is also contemplated that, in some embodiments, different kinds of hardware descriptive languages (HDL) may be used in the process of designing and manufacturing very large scale integration circuits (VLSI circuits) such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., data storage units 160, RAMs 155 (including embedded RAMs, SRAMs and/or DRAMs), caches 130, compact discs, DVDs, solid state storage devices and/or the like). In some embodiments, the GDSII data (or other similar data) may be adapted to configure a manufacturing facility (e.g., through the use of mask works) to create devices capable of embodying various aspects described herein, in the instant application. In other words, in various embodiments, this GDSII data (or other similar data) may be programmed into a computer, processor or controller, which may then control, in whole or part, the operation of a semiconductor manufacturing facility (or fab) to create semiconductor products and devices. For example, in one embodiment, silicon wafers containing one or more CPUs 140, GPUs 125, SQ circuitry 135, hardware state machines and/or algorithms (not shown), caches 130, and/or the like may be created using the GDSII data (or other similar data).

It should also be noted that while various embodiments may be described in terms of SQ circuitry associated various processors or cacheable store replays, it is contemplated that the embodiments described herein may have a wide range of applicability, for example, in various devices that include processing devices, as would be apparent to one of skill in the art having the benefit of this disclosure.

The particular embodiments disclosed above are illustrative only, as the embodiments herein may be modified and practiced in different but equivalent manners apparent to those skilled in the art having the benefit of the teachings herein. Furthermore, no limitations are intended to the details of construction or design as shown herein, other than as described in the claims below. It is therefore evident that the disclosed embodiments may be altered or modified and all such variations are considered within the scope of the disclosed embodiments.

Accordingly, the protection sought herein is as set forth in the claims below.

The invention claimed is:

1. A method, comprising:
   determining whether to replay a store instruction to re-acquire at least one cache line based upon a state of the store instruction indicated by a status of said at least one cache line, an execution phase of the store instruction, and a determination whether at least one previous replay of the store instruction modified the status of said at least one cache line to be closer to a writeable state that allows the store instruction to commit; and
   replaying the store instruction in response to determining to replay the store instruction.

2. The method of claim 1, wherein states of the store instruction comprise the writeable state, a pending state in which said at least one cache line for the store instruction is not present in a cache but is in a process of being acquired, or a replay state in which said at least one cache line for the store instruction is not present in the cache and is not in the process of being acquired.

3. The method of claim 1, wherein determining whether to replay the store instruction comprises determining whether to replay the store instruction based on a configurable number of geed-replays of the store instruction that modify the state of said at least one cache line to be closer to the writeable state during the execution phase.

4. The method of claim 3, comprising replaying the store instruction in response to determining that the store instruction has completed but not yet retired and the store instruction has not performed the configurable number of replays following completion of the store instruction.

5. The method of claim 4, comprising replaying the store instruction in response to determining that the store instruction has retired but the store instruction is not yet the oldest store instruction in a store queue and the store instruction has not performed a replay that modified the state of said at least one cache line to be closer to the writeable state since the store instruction retired.

6. The method of claim 5, comprising replaying the store instruction until said at least one cache line is in the writeable state in response to determining that the store instruction is the oldest store instruction in the store queue but the store instruction has not yet committed.

7. The method of claim 4, wherein replaying the store instruction comprises selecting the store instruction from a plurality of store instructions eligible for replay using a fairness algorithm, round-robin arbitration, age-based arbitration, or an implementation-specific algorithm.

8. An apparatus, comprising:
   store queue circuitry configurable to determine whether to replay a store instruction to re-acquire at least one cache line based upon a state of the store instruction indicated by a status of said at least one cache line, an execution phase of the store instruction, and a determination whether at least one previous replay of the store instruction modified the status of said at least one cache line to be closer to a writeable state that allows the store instruction to commit.

9. The apparatus of claim 8, wherein the store queue circuitry comprises a state machine that is configurable to determine the state of the store instruction, and wherein states of the store instruction comprise the writeable state, a pending state in which said at least one cache line for the store instruction is not present in the cache but is in the process of being acquired, or a replay state in which said at least one cache line for the store instruction is not present in the cache and is not in the process of being acquired.

10. The apparatus of claim 8, wherein the store queue circuitry is configurable to determine whether to replay the store instruction based on a configurable number of replays of the store instruction that modify the state of said at least one cache line to be closer to the writeable state during the execution phase.

11. The apparatus of claim 10, comprising replay logic configurable to replay the store instruction in response to the store queue circuitry determining that the store instruction has completed but not yet retired and the replay logic has not performed the configurable number of replays of the store instruction following completion of the store instruction.

12. The apparatus of claim 11, wherein the replay logic is configurable to replay the store instruction in response to the store queue circuitry determining that the store instruction has retired but the store instruction is not yet the oldest store instruction in a store queue in the store queue circuitry and the replay logic has not performed a goad replay of the store instruction that modified the state of the at least one cache line to be closer to the writeable state since the store instruction retired.

13. The apparatus of claim 12, wherein the replay logic is configurable to replay the store instruction until said at least one cache line is in the writeable state in response to the store queue circuitry determining that the store instruction is the oldest store instruction in the store queue but the store instruction has not yet committed.

14. The apparatus of claim 11, comprising an arbitration unit and a multiplexer configurable to select the store instruction from a plurality of store instructions eligible for replay using a fairness algorithm, round-robin arbitration, age-based arbitration, or an implementation-specific algorithm.

15. A non-transitory computer readable medium including instructions that when executed configure a manufacturing process used to manufacture a semiconductor device comprising:
   store queue circuitry configurable to determine whether to replay a store instruction to re-acquire at least one cache line based upon a state of the store instruction indicated by status of said at least one cache line, an execution phase of the store instruction, and a determination whether at least one previous replay of the store instruction modified the status of said at least one cache line to be closer to a writeable state that allows the store instruction to commit.

16. The non-transitory computer readable medium set forth in claim 15, further comprising instructions that when executed configure the manufacturing process used to manufacture the semiconductor device comprising replay logic configurable to replay the store instruction in response to the store queue circuitry determining that the store instruction is eligible to be replayed.

17. The non-transitory computer readable medium set forth in claim 16, further comprising instructions that when executed configure the manufacturing process used to manufacture the semiconductor device comprising an arbitration unit and a multiplexer configurable to select the store instruction from a plurality of store instructions eligible for replay using a fairness algorithm, round-robin arbitration, age-based arbitration, or an implementation-specific algorithm.

* * * * *